United States Patent [19]

Inculet et al.

[11] Patent Number: 5,289,922
[45] Date of Patent: Mar. 1, 1994

[54] ELECTROSTATIC SEPARATION OF MIXED PLASTIC WASTE

[75] Inventors: Ion I. Inculet; G. S. P. Castle; James D. Brown, all of London, Canada

[73] Assignee: The University of Western Ontario, London, Canada

[21] Appl. No.: 952,096

[22] Filed: Sep. 28, 1992

[51] Int. Cl.$^5$ ................................................ B03C 7/00
[52] U.S. Cl. ................................. 209/127.1; 209/127.4
[58] Field of Search ..................... 209/2, 127.1, 127.2, 209/127.3, 129, 131, 930, 128, 129, 130, 127.4

[56] References Cited

U.S. PATENT DOCUMENTS

| | | | |
|---|---|---|---|
| 4,144,163 | 3/1979 | Kolm | 209/127.1 X |
| 4,839,032 | 6/1989 | Whitlock | 209/127.1 X |
| 4,874,507 | 10/1989 | Whitlock | 209/127.1 X |
| 5,118,407 | 6/1992 | Beck et al. | 209/127.3 X |

FOREIGN PATENT DOCUMENTS 0264048  7/1970  U.S.S.R. ............................ 209/127.1

Primary Examiner—Joseph L. Valenza
Assistant Examiner—Tuan N. Nguyen
Attorney, Agent, or Firm—R. Craig Armstrong

[57] ABSTRACT

A mixture of particles of plastic materials having different work functions is fed through a rotating tube. The tube rotates about an axis which is inclined slightly to the horizontal. The tube is of plastic or metallic material, preferably having a rib for stirring the mixture. As the particles pass progressively down the length of the tube, the triboelectrically induced charge progressively increases, whereby the particles are highly charged upon emerging from the tube. The tube may be made of the same material as a minority component of the mixture to bring up the level of the charge on the majority component.

8 Claims, 5 Drawing Sheets

ELECTROSTATIC SEPARATION OF MIXED PLASTIC WASTE

BACKGROUND OF THE INVENTION

1. Field of the Invention

This invention relates to the separation of materials, particularly waste plastic materials, such separation being particularly desirable for the purpose of recycling and reusing the materials. The invention may also be used for separating other electrically insulating materials from each other, or from conductive materials such as metals, as will be explained later herein.

Waste plastic is typically derived from either garbage or from production waste during the production of plastic consumer goods, and there is a need to separate different types of plastic. Electrostatic separation, i.e. separating plastics according to their electrostatic charges, is known as one means of accomplishing this desired separation. The waste plastic is first chopped or shredded into relatively small particles, and then separated electrostatically after charging by suitable means.

Electrostatic charges build up on electrically insulating materials (including most plastics) when different such materials, having different work functions, are brought into contact. Assuming that the work function of material A is smaller than that of material B, the direct physical contact of material A on material B results in an electron transfer from A to B. The materials become tribocharged. Material A becomes positively charged, and material B, which gains the electrons, becomes negatively charged.

Tribocharging occurs only when the work functions of the two materials which are in contact are different. In some rare cases, depending on the crystal structure of the materials, one may encounter a slight difference in the work function at one point of the crystal of the material as compared to another point on the surface of the same crystal. In such a case, a very small triboelectrification may occur even between the same materials.

The different rates at which plastic materials pick up charges when contacted in this manner can be used as the basis for separating material A from material B by means of electric fields when the two materials are present in a mixture. The invention is aimed at improving the extent to which the magnitude of the tribocharge can be built up in the materials, and hence at improving the efficiency of separation.

Triboelectrification may be used only between electrically insulating materials, or between metals and electrically insulating materials. Triboelectrification may not be used to separate electrically conductive materials such as two metals. For example, if one were to contact copper and nickel, a charge transfer would occur, since the work function of the nickel is considerably higher than that of copper. However, if one then tried to separate the particles, the charge would immediately flow back to where it came from, and the net result would be that both metallic particles would be neutral after separation.

2. Description of the Prior Art

It has previously been proposed to impart electrostatic charge to particles of plastic by triboelectrification techniques involving fluidized bed technology. In such a method, a large body of the particles is caused to be in constant heaving motion, whereby the particles are constantly rubbing each other, and rubbing the bed in which they are contained. Such a method is effective in triboelectrifying the particles, but is expensive in view of the amount of energy expended in fluidizing the mass of particles, e.g. via large flows of air.

It is an aim of the invention to provide an alternative means of triboelectrification, which will operate highly effectively and with less capital cost and expenditure of energy than in fluidized bed apparatus.

It is a further aim of the invention to provide an apparatus which is versatile and simple to operate, and is compatible with other phases of electrostatic separation systems, and which can be easily adjusted to suit a variety of operating requirements.

SUMMARY OF THE INVENTION

A first aspect of the invention consists in an apparatus for tribocharging particles of insulating materials; the apparatus includes a vessel for containing the particles, and the vessel is of such material that the work function of the material of the vessel is different from that of the materials of at least some of the particles in the vessel.

The vessel is rotatable, and the apparatus includes a means for rotating the vessel about an axis of rotation. The orientation of the axis of rotation is such that, in operation of the apparatus, the particles tumble against each other and against the walls of the vessel, thereby becoming tribocharged.

Preferably, the mixture of the plastic materials to be separated is fed into the vessel at an entry point thereof, and emerges from the tube at an exit point thereof. The entry point is separated from, and spaced from, the exit point. The apparatus includes means for gradually and progressively moving the material through the vessel from the entry point to the exit point; and the arrangement of the apparatus is such that the material at any point in the progression therebetween is kept separated from the material at other points in the progression.

The progression of the particles through the vessel is such that the particles do not mix generally, i.e. with particles at different levels of charge, but only with particles at the same level of charge. Therefore, the charge on the particles is enabled to increase progressively, without being dissipated, as the particles travel through the vessel.

Preferably, the vessel is in the form of a tube, which is open at each end, with the tribocharged particles entering at one end and emerging from the other end of the tube. The tube is mounted for rotation, and the axis of rotation of the tube is inclined at a slight angle to the horizontal, downwardly from the inlet to the outlet.

Preferably, the speed of rotation of the tube, and the said slight angle, are adjustable.

Preferably, the mixture of the particles of different insulating materials is fed into the higher end of the rotating tube, and the tribocharged particles emerge from the lower end. Preferably, the mixture of particles is fed into and through the tube on a continuous basis.

Preferably, the tube includes at least one rib of the same material as the tube, the rib extending radially inwardly from the inside surface of the wall of the tube. The rib is disposed along the axial length of the tube, so that as the tube rotates, the rib serves to tumble the mixture of particles residing in the tube.

Preferably, the vessel is of the same material as some, but not most, of the particles in the mixture, although it may be made out of other materials, such as a metal with a suitable work function, copper being one example.

The separation apparatus may include a channel positioned in line with the end of the tube, the channel having at least one opening (e.g. an elongated slot, preferably tapered, or a plurality of small holes) along the bottom thereof for particles to drop therethrough as a curtain of particles, high voltage electrodes being arranged vertically on either side of the channel and extending therealong and downwardly to separate the particles.

BRIEF DESCRIPTION OF THE DRAWINGS

By way of further explanation of the invention, exemplary embodiments of the invention will now be described with reference to the accompanying drawings, in which.

DETAILED DESCRIPTION OF PREFERRED EMBODIMENT

The structures and operations shown in the accompanying drawings and described below are examples which embody the invention. It should be noted that the scope of the invention is defined by the accompanying claims, and not necessarily by specific features of exemplary embodiments.

Figure 1:
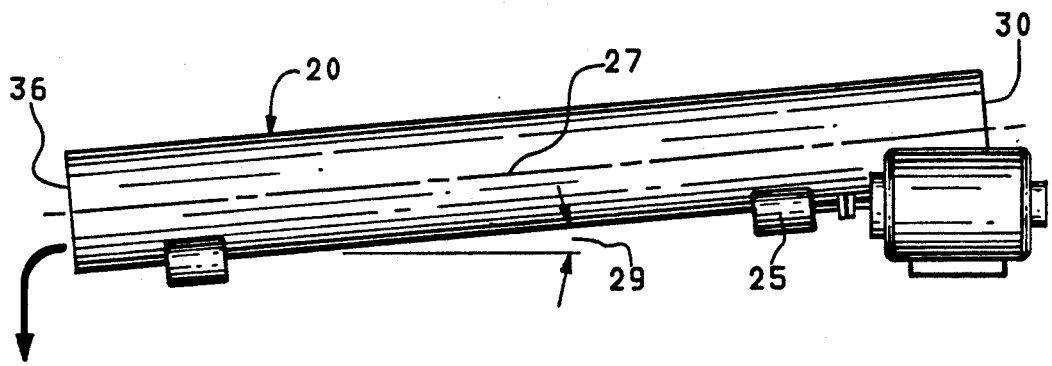
FIG. 1 is a side elevation of a rotating tube, through which are passed particles of plastic to be tribocharged.

In FIG. 1, an elongate tube 20 rests on rollers 25, whereby the tube is supported and guided for rotation. One of the rollers 25 is driven by means of a suitable electric or other motor, the drive being frictionally transmitted to the tube 20. The tube 20 is right cylindrical, its axis of rotation, which is also its geometric axis 27, being disposed at a slight angle 29 to the horizontal, downwardly from the upper (inlet) end 30 to the lower (outlet) end 36.

Figure 6:
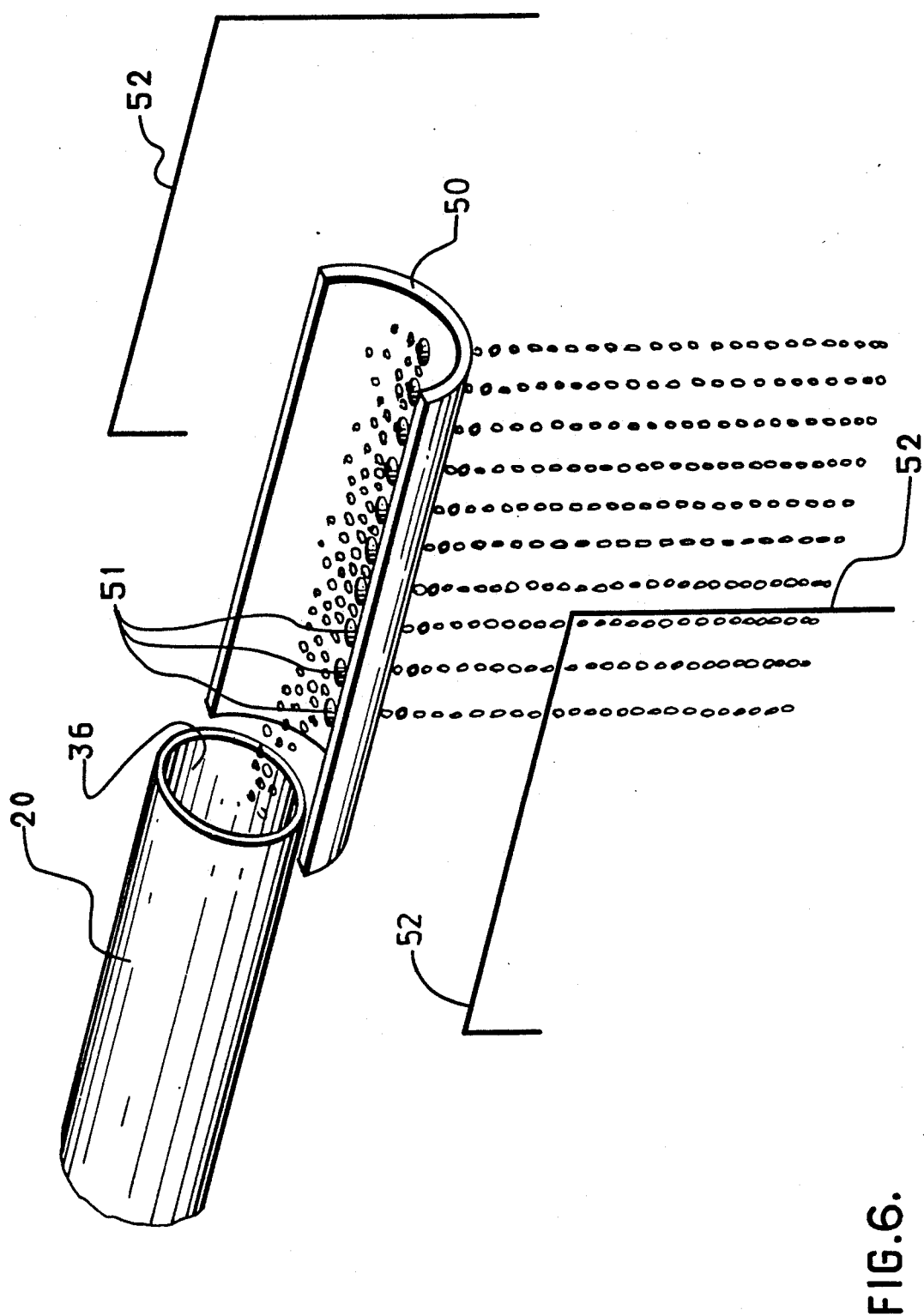
FIG. 6 is a perspective view showing a separation apparatus positioned adjacent the outlet of the tube.
Figure 7:
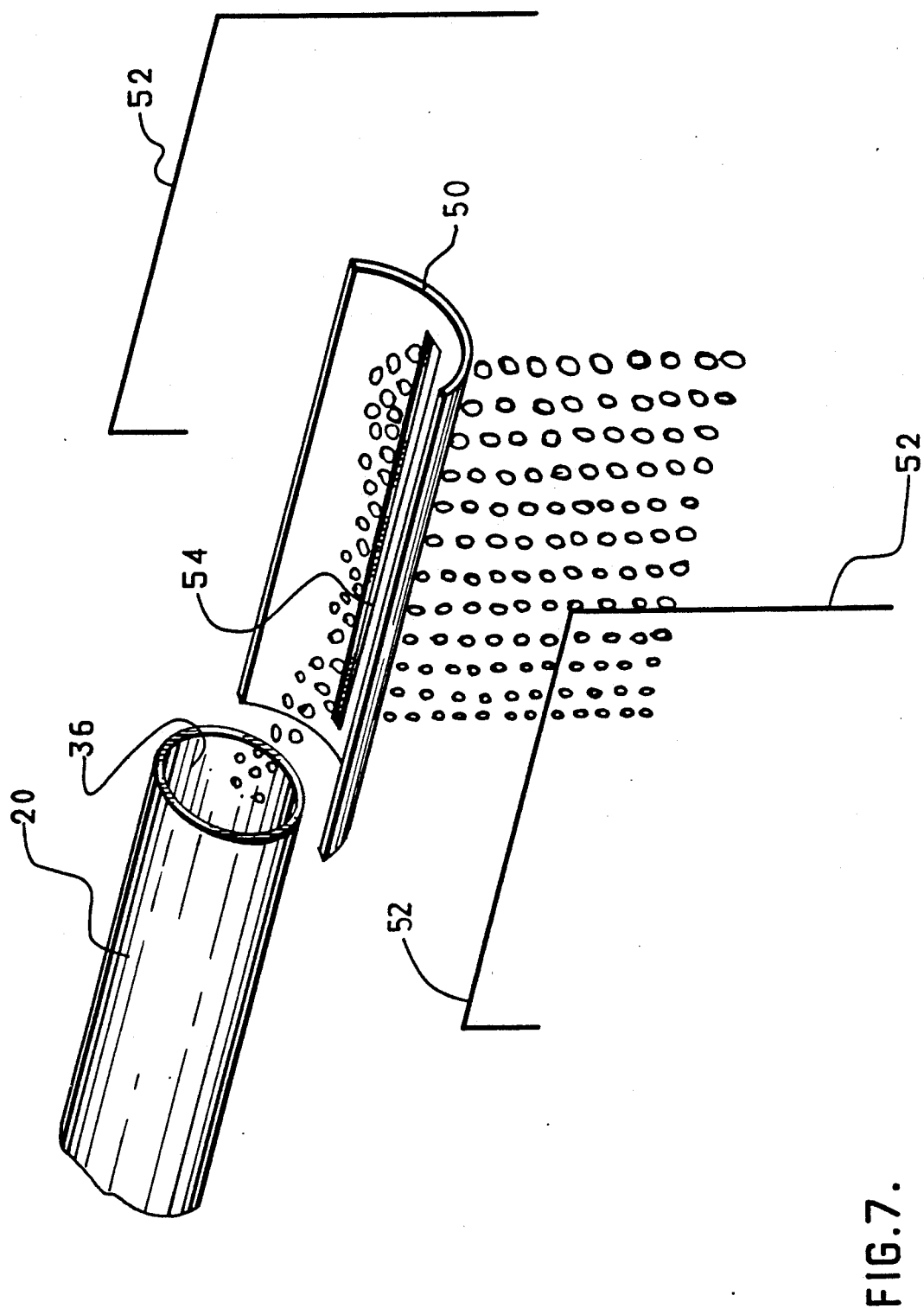
FIG. 7 is a perspective view showing alternative separation apparatus.

A mixture of particles of plastic materials to be separated is fed into the upper end 30 of the tube 20. The particles of the different materials spend some time inside the rotating tube, being tumbled about inside the tube, against each other and against the inside surface 32 of the walls 34 of the tube, becoming electrostatically charged. The amount of charge transferred is not sufficient to cause the particles to stick together; the mechanical disruption forces from the tumbling action in the tube are substantially larger that the electrical forces between oppositely charged particles. The particles then emerge from the lower end 36 of the tube, and pass to the next stage of the system for electrostatic separation. Such next stage may include, for example, as shown in FIG. 6, a channel 50 positioned in line with the end of the tube, the channel having a plurality of openings 51 along the bottom thereof for particles to drop therethrough as a "curtain". FIG. 7 shows a similar arrangement, in which a tapered slot 54 is used instead of the openings 51. High voltage electrodes 52 are arranged vertically on either side of the channel and extend therealong and downwardly to separate the particles. The channel and the openings or tapered slot therein act as a distribution system to spread the particles apart after they emerge from the tube, such that they fall in the form of a "curtain". By spreading the particles in this fashion between the two high voltage electrodes which separate the particles, the separation is considerably enhanced because there is less mutual shielding of particles from the electric field.

The tube 20 is made of an insulating plastic material. In fact the material of the tube walls may be the same material as one of the plastic materials present in the mixture, as will be discussed below. In a plastic cylinder, the triboelectrification between the particles which contact the inside surface of the tube continues indefinitely because the electric field at a uniformly charged inside surface of a cylindrical tube is essentially zero. If one were to use a flat surface, after a number of contacts, the electric charges which develop on the surface of the plastic material would establish a surface electric field, which would prevent any further triboelectrification of the particles which contacted the surface.

Figure 2:
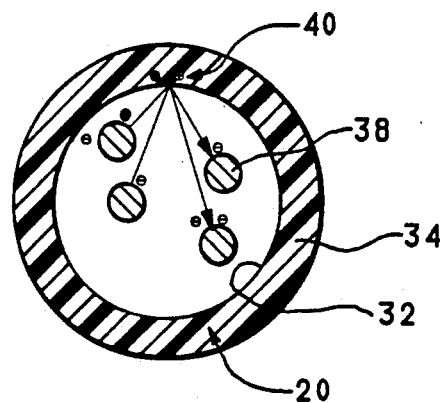
FIG. 2 is a schematic diagram showing how electrostatic charges build up by triboelectrification on particles of insulating material in a rotating tube.

FIG. 2 is a schematic diagram showing particles in the rotating tube 20. A particle 38 tumbles against a point 40 on the inside surface 32 of the wall 34 of the tube, and then falls clear; the material of the particle 38 being of a higher work function than the material of the tube, the particle 38 acquires a negative charge, and the point 40 on the tube acquires an equal positive charge, the sum of the two charges being zero.

As the tube rotates, and the particles continue to tumble, and to traverse gradually along (and down) the tube, the triboelectrically induced charges continue to increase in magnitude on both the particles and the tube (the sum being zero).

Because of the arrangement and rotation of the tube 20, the particles at the lower end 36 of the tube, which have gradually acquired the most charge, are well separated from the particles just entering the tube, which have not as yet picked up much charge. The magnitude of the charges on the particles continues to increase as the particles pass through the tube, rather than being equalised throughout the whole body of the particles.

If some of the uncharged particles do contact already charged particles (something which happens continuously in a fluidized bed system), there is not a major problem. If a charged A particle contacts an uncharged A particle, depending on the point of contact, either some charge from the charged particle will be transferred to the uncharged particle (so that both particles will have charges of the same polarity) or there might be no charge transfer at all. Normally, the tribocharges on electrically insulating particles do not spread over the entire surface of the particle but are rather localized in a certain area of the particle. Should the contact with the uncharged A particle occur at a point where there is no charge on the charged A particle contact point, there will be no triboelectrification present. On the other hand, if a charged A particle contacts a noncharged B particle, depending again on the point of contact, the charge on the charged particle may increase with the same polarity whereas the B particle will, in practically all cases, acquire a charge of opposite polarity.

The particles are fed through the tube 20 on a continuous and progressive basis, the rate of feed, the speed of rotation, and the angle 29 of inclination of the tube being such as to give rise to a residence time of the particles in the tube which is sufficient to give the required magnitude of charge. It will be understood that these parameters can be adjusted and controlled very conveniently and accurately, whereby the particles can be given the desired charge in the most efficient and economical manner.

FIG. 2 is a cross-section taken at a particular location along the length of the tube 20, and it will be understood that all the particles of a material A at that location will have acquired charges of one polarity (negative in this example), and all the particles of the different material B will have acquired the opposite charge (positive in this example). The magnitude of the charges acquired by the individual A and B particles depends on the number of particle to particle contacts during the tumbling action up to that location in the tube. It will be understood that there is no tendency towards equalisation of the charges between the particles along the length of the tube.

Figure 3:
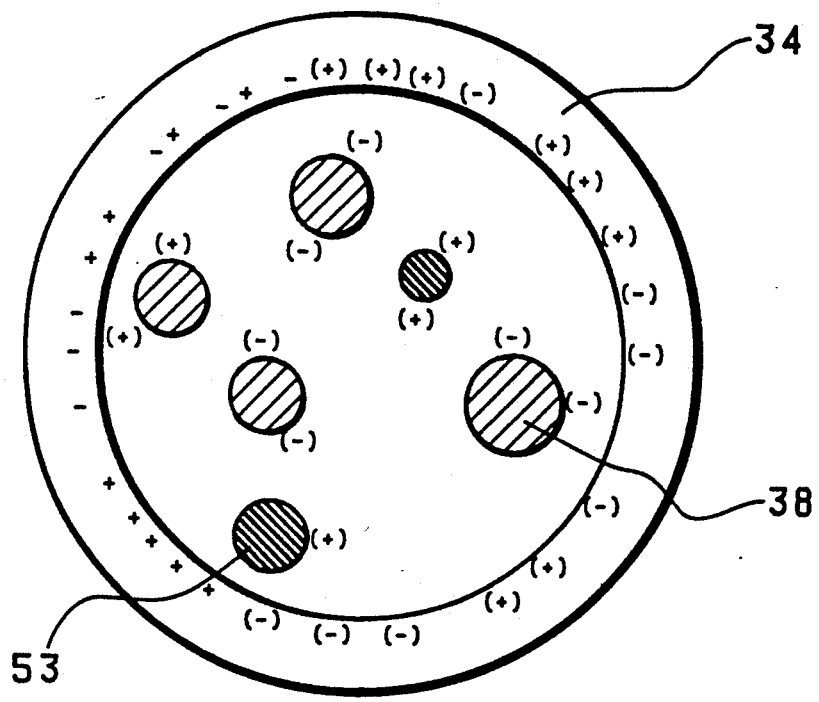
FIG. 3 is another schematic diagram, similar to FIG. 2, but with two different particle materials.

FIG. 3 is similar to FIG. 2, but shows particles of two different materials, namely particles 38 and particles 53. If the work function of the particles 38 is greater than the work function of the inside surface of the tube 34, and the work function of the particles 53 is less than the work function of the inside surface of the tube 34, then after tumbling, the particles 38 are tribocharged negatively, and the particles 53 are tribocharged positively. The tube 34 is tribocharged to some net positive or negative value, depending on how many electrons were lost and gained in contact with the particles 38 and 53.

Figure 4:
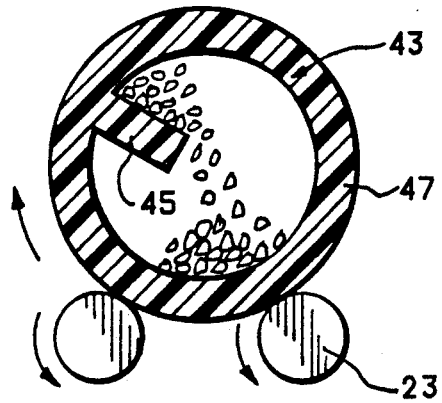
FIG. 4 is an end elevation of another rotating tube, with an internal rib.
Figure 5A:
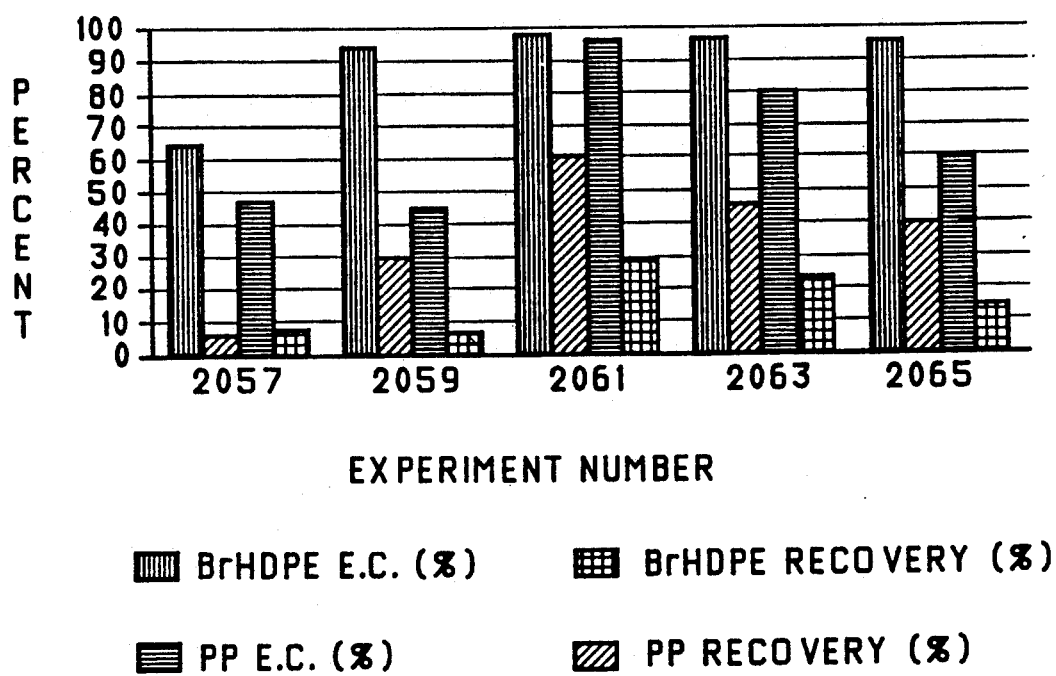
FIGS. 5A and 5B are graphs showing comparative efficiencies of separation of a tube with no ribs and a tube with one rib, respectively.
Figure 5B:
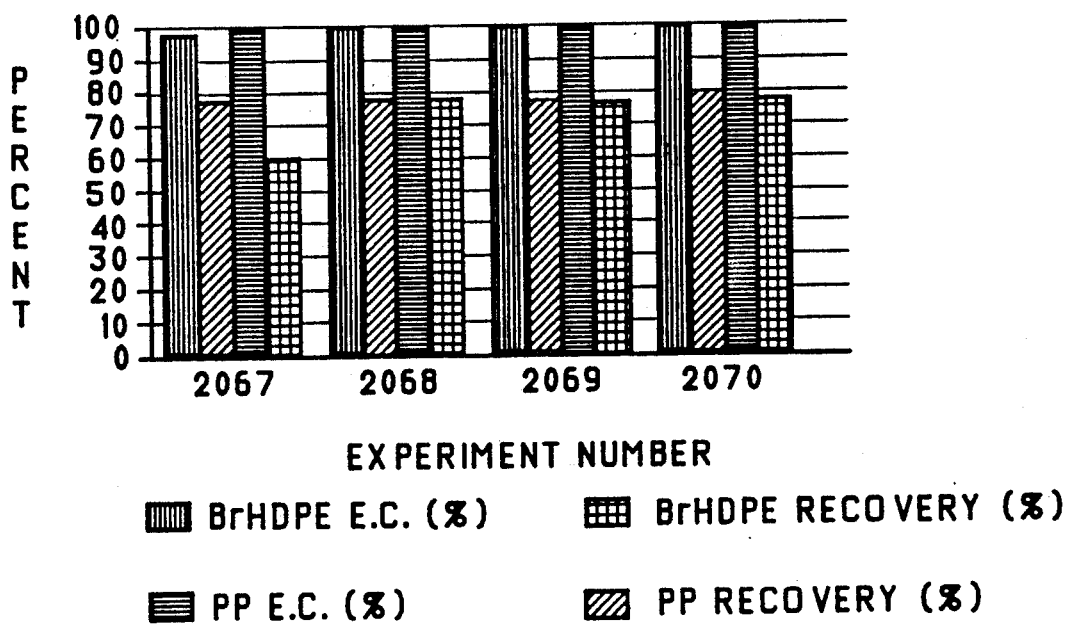

FIG. 4 shows a modified version of the rotating tube 43, in which a rib 45 extends radially inwardly from the wall 47 of the tube. The rib is made of the same insulating material as the tube itself. The degree of mixing is much improved by the use of the rib 45, as can be readily seen from a comparison of FIGS. 5A and 5B. FIG. 5A is a graph showing the efficiency of separation when no rib is present, and FIG. 5B shows the improvement that arises from the rib. It may be preferred to provide only one rib, or several ribs, in particular cases.

The material from which the tube is made can be a parameter in the efficiency of the tribocharging process. The tube can be made from the same material as some of the particles in the mixture being processed through the tube. Consider the case, for example, of a mixture of two plastics, P1 and P2, wherein P1 is much more plentiful than P2; now, if the tube is made from material P2, the more plentiful plastic P1 picks up charge not only when it strikes the (rare) particles of P2, but also when it strikes the P2 walls of the tube. Therefore, making the tube from the minority material in the mixture can serve to bring up the level of the charge at which the majority material emerges from the tube to the magnitude of the charge induced in the minority material. This is an important (though not essential) feature of the invention, permitting the triboelectrification process to be enhanced considerably.

The system will also work with a tube made out of metal. In the case of a metal vessel, the cross-sectional shape of the vessel is not critical, although the cylindrical shape remains most convenient. Also, the cylindrical shape is preferred for prolonged operation in any event, since such prolonged operation may produce a plastic coating on the inside of the tube. This would transform the metal tube into the equivalent of a plastic (i.e. insulating) tube, requiring the cylindrical geometry.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. An apparatus for tribocharging particles of electrically insulating materials, the apparatus comprising a tube rotatable about its longitudinal axis and inclined at an angle to the horizontal, the particles being adapted to be gradually and progressively moved longitudinally through the tube from an entry point to an exit point, movement of the particles through the tube resulting in the particles making contact with the tube and with each other, the tube being formed from a material with an electrostatic work function that is different from that of the particles, the difference in the electrostatic work function between the tube and the particles resulting in the particles becoming increasingly tribocharged as they move from the entry point to the exit point on the tube.

2. An apparatus as in claim 1, and also comprising a feeding means for feeding particles into the entry point on the tube, and a receiving means for receiving charged particles from the exit point on the tube.

3. An apparatus as in claim 1, and also comprising a speed adjustment means for adjusting the rotational speed of the tube, and an angle adjustment means for adjusting the longitudinal axis angle of the tube to the horizontal.

4. An apparatus as in claim 1, wherein the tube is of right cylindrical cross-section.

5. An apparatus as in claim 1, wherein the tube includes at least one rib extending radially inward from the inside surface of the tube, the rib extending the axial length of the tube.

6. An apparatus as in claim 1, in combination with a mixture of particles of plastic materials, the tube being of the same material as a minority of the particles in the mixture.

7. An apparatus as in claim 1, 2 or 3, and further comprising a separation means, the separation means comprising a channel and high voltage electrodes, the channel being positioned in line with the exit end of the tube and having at least one opening along its bottom for particles to drop through, the high voltage electrodes being arranged vertically on either side of the channel and extending therealong and downwardly to separate the particles.

8. An apparatus as in claim 4, 5 or 6, and further comprising a separation means, the separation means comprising a channel and high voltage electrodes, the channel being positioned in line with the exit end of the tube and having at least one opening along its bottom for particles to drop through, the high voltage electrodes being arranged vertically on either side of the channel and extending therealong and downwardly to separate the particles.

* * * * *